June 13, 1967 — J. M. BENEDICK — 3,325,026
POSITIONING APPARATUS
Filed Oct. 18, 1965 — 2 Sheets-Sheet 1

JOSEPH M. BENEDICK
INVENTOR.

BY
ATTORNEY

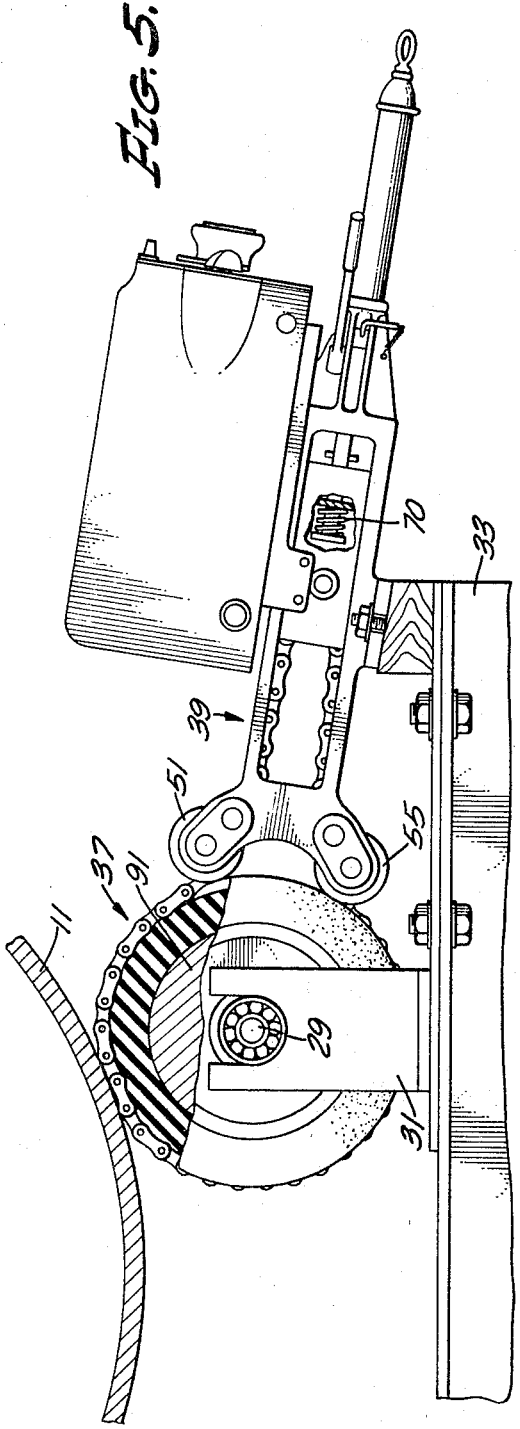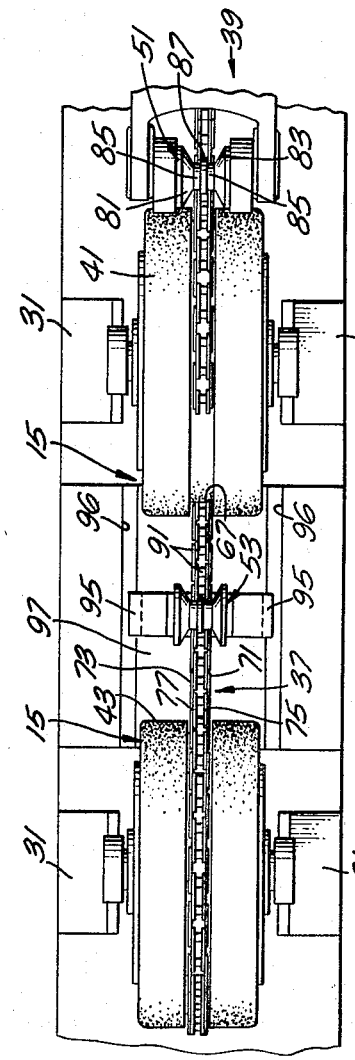

United States Patent Office 3,325,026
Patented June 13, 1967

3,325,026
POSITIONING APPARATUS
Joseph M. Benedick, Rosemead, Calif. (2254 N. Kays Place, South San Gabriel, Calif. 91777)
Filed Oct. 18, 1965, Ser. No. 497,430
9 Claims. (Cl. 214—340)

The present invention relates to mechanical apparatus designed for positioning or turning vessels such as tanks, pipes, or tubing, and more particularly to machines for facilitating the performance of welding, cutting or other operations along a line around the work-piece.

There is a great need for a simple and inexpensive device for slowly turning heavy vessels such as pipes, etc. which have large diameters, while welding, cutting, grinding, coating, or similar operations are performed upon the pipe or other work piece. Patent No. 2,460,671 discloses a positioning means invented by the present inventor, and which has been found to work very well in a variety of vessel-turning situations.

The positioning means disclosed in Patent No. 2,460,671, however, is suitable by itself only in situations where the workpiece or vessel is of sufficiently small diameter for the chain to be wrapped around the perimeter thereof. Difficulties are experienced when the work-piece is of a larger diameter.

It is an object of the present invention, therefore, to provide a novel positioning apparatus.

It is another object of the present invention to provide a positioning apparatus which can be used to turn vessels having large diameters.

It is still another object of the present invention to provide a positioning apparatus which can be used to slowly turn heavy vessels such as pipes having very large diameters while welding, cutting, or similar operations are performed along a line therearound.

It is yet another object of the present invention to provide a positioning apparatus which is portable and can be used for the welding of pipes in the field.

According to one embodiment of the present invention, a positioning apparatus comprises the combination of a known chain-driven positioning means and one or more drive wheels around which the chain passes. The wheels turn the work-piece by means of the friction caused by the weight thereof. Thus, the chain passes around the drive wheel or wheels, and not around the work-piece which is to be turned.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 3 is a top view of the positioning apparatus shown in FIGURE 2.

FIGURE 5 is a partially sectional view of a different embodiment of the positioning apparatus of the present invention.

Figures 1, 2, 4:
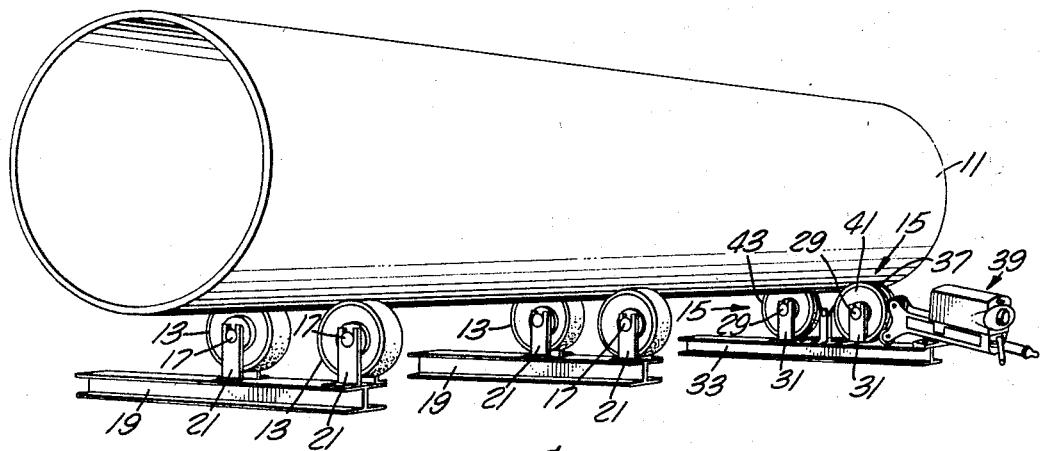
FIGURE 1 is an isometric view of positioning apparatus in operation according to the present invention.
FIGURE 2 is a side view showing the positioning apparatus of FIGURE 1 in detail.
FIGURE 4 is a view taken along the line 4—4 of FIGURE 2.

Turning now to the drawings, FIGURE 1 shows pipe 11 lying upon idler wheels 13 and drive wheels 15. Pipe 11 is the large-diameter pipe which is to be slowly rotated so that a welding or similar operation can be performed around its perimeter. Pipe 11 can be any desired length and the number of pairs of idler wheels 13 which is required will depend upon the weight and length of pipe 11. It has been found satsfactory to use one pair of wheels for every 6 to 8 feet of length when pipe 11 weighs from 2 to 10 tons. Each idler wheel 13 is mounted upon an axle 17, and each pair of idler wheels 13 is supported upon an I-beam 19 by means of a support 21 connected by ball bearings to each end of axle 17.

Drive wheels 15 are each mounted upon an axle 29, which is supported at each end by ball bearings and a support 31. Supports 31 are bolted to I-beam 33 and can be moved to the desired location by means of channels therein and bolted thereto, depending upon the size of the work piece. Chain 37 of positioning means 39 is wrapped around tire 41 of one drive wheel 15 and tire 43 of the other drive wheel 15. The nature and operation of the power unit or positioning means 39 and chain 37 thereof are described in detail in U.S. Patent No. 2,460,671. Several power units can be used in tandem if the work piece is too heavy or long for one power unit to handle.

FIGURES 2 and 3 show the positioning apparatus involving drive wheels 15 in greater detail. Chain 37 passes under chain guide 51, over tire 41, under chain guide 53, around tire 43, under tire 41, and over chain guide 55. Positioning means 39 is used to draw chain 37 tightly about drive wheels 15, and then to cause drive wheels 15 to slowly rotate, thereby slowly rotating pipe 11 resting thereon. Chain guide 53 maintains chain 37 in frictional contact with both drive wheels, and also serves to keep chain 37 down and clear of pipe 11.

FIGURE 4 shows how the weight of pipe 11 lying upon the drive wheels compresses tires 41 and 43, which are mounted upon tire rims 63 and 65, respectively. FIGURE 4 also shows how chain 37 fits within groove 67, so as to lie flush with the surface 69 of tires 41 and 43 as a result of the weight of the work piece. A groove 67 is provided completely around the tire of each drive wheel 15. In its unloaded condition, the groove 67 is about ⅞″ wide by ½″ deep. Since the widest part of chain 37 is about 9/16″, chain 37 protrudes about 1/16″ beyond the surface of tires 41 and 43 without the work piece thereon.

The tires used for drive wheels 15 should be about 6 inches wide and made of a hard rubber having a durometer density of 80–95. This range has been found to be practical and will withstand the heat caused by welding or flame cutting near or next to the rubber wheels. The rubber also retains sufficient elasticity to grip the roller chain which is used in driving the wheels, without allowing the weight of the work piece being turned from flattening the rubber out of shape. This is especially important when pipes, tanks or round vessels are being arc or gas welded, because they require the maintenance of as perfect a diameter as possible.

A constant spring tension is applied to the chain 37 by means of compression spring 70 of positioning means 39, so as to keep it in positive contact with the rubber tires which are grooved to a depth slightly less than the thickness of chain 37. This spring tension, plus the bearing weight of the work piece, forces the rubber tires to enclose chain 37 as if it were imbedded in the rubber tires, thereby creating a non-slip drive mechanism. In addition, the spring tension eliminates back lash, such as is encountered in the use of conventional gear-driven positioning equipment. Back lash can cause a welding arc to break and fracture an otherwise perfect weld.

As can be seen most clearly in FIGURE 4, outside plates 71 and 73, and inside plates 75 and 77 of chain 37 are of the same vertical width at their widest dimension, as opposed to conventional chains in which the inside plates are smaller in width than the outside plates. Chain 37, by virtue of its equal outside and inside plates, offers a greater surface area to the tire and the work piece or pipe 11. As a consequence, less slippage occurs and there is provided a greater turning torque force.

Chain guides 51, 55 and 53, which are used instead of conventional chain sprockets, facilitate automatic alignment of chain 37 and eliminate much of the manual handling thereof. The self-aligning chain guide 51, for example, as shown most clearly in FIGURE 3, has sloping inner sides 81 and 82 separated by cylindrical central region 85. Raised ridge portion 87 is centrally located concentrically about cylindrical region 85. In replacing conventional chain sprockets by self-aligning chain guides 51 and 55, for example, the necessity of placing the chain upon the sprockets by hand when pressure ratcheting the chain, as described more fully in U.S. Patent No. 2,460,671, is eliminated. Even when chain guides 51 and 55 are used in conjunction with power unit 39 and chain 37 is wrapped directly around the work piece, a great improvement is realized.

When the chain 37 is placed in contact with chain guide 51, the sloping inner sides 81 and 83 cause the chain to easily slide onto raised portion 87. Chain guide 51 rotates freely by means of ball bearings. The load exerted by chain 37 upon chain guide 51 is carried on the rollers 91 of the chain, as it should be. The raised ridge portion 87 is high enough to support chain 37 clear of central region 85, thereby preventing undue wear from occurring on outside plates 71 and 73 and inside plates 75 and 77. In addition, a postive and constant alignment of chain 37 and pipe 11 is achieved.

Idler chain guide 53 is identical to chain guides 51 and 55, and rotates freely by means of ball bearings mounted in supports 95, which are slidably mounted upon channel 97 of I-beam 33. The lower end of each support 95 passes through a channel 96 and is bent around central region 97 of I-beam 33. Supports 95 are free to slide as a unit in accordance with the chain pressure caused by the location of drive wheels 15 and are, therefore, self aligning.

FIGURE 5 shows a portion of a different embodiment which is the same as has been described, except that instead of chain 37 being wrapped around a pair of drive wheels, it is wrapped around only one drive wheel 91. Thus, the other drive wheel, which is not shown in FIGURE 5, merely serves as an idler wheel. Chain guide 53 is, therefore, not needed and has been omitted in FIGURE 5.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. Positioning apparatus for rotating a work piece to be operated upon along a line circumferentially passing around the work piece, comprising:
    (a) at least one drive wheel having a tire,
    (b) at least one idler wheel, said drive and idler wheels supporting said work piece thereupon, and
    (c) positioning means including a chain encircling said drive wheel in frictional contact with the tire thereof to cause the rotation thereof, and power means to drive said chain.

2. Positioning apparatus for rotating a work piece to be operated upon along a line circumferentially passing around the work piece, comprising:
    (a) a pair of drive wheels each having a tire mounted thereon,
    (b) a pair of idler wheels, said drive and idler wheels being positioned to support said work piece thereupon, and
    (c) a power unit including a chain encircling said drive wheels in frictional contact with the tires thereof to cause the rotation thereof, and power means to drive said chain.

3. Apparatus as defined in claim 2 in which each of said tires of said drive wheels is made of a resilient material and has a groove about the circumference thereof, each of said grooves being sufficiently large and deep to receive said chain, so that the weight of said work piece imbeds said chain in said tires.

4. Apparatus as defined in claim 3 in which said chain has inside and outside plates, the widest dimensions of each being equal.

5. Apparatus as defined in claim 2 including at least one chain guide having a pair of oppositely facing sloping inner sides separated by a central region which has a raised portion located centrally and concentrically thereabout.

6. Apparatus as defined in claim 5 in which said chain guide is positioned between said drive wheels in a location where it deflects said chain away from said work piece when said work piece is resting upon said drive wheels.

7. Positioning means for rotating a work piece to be operated upon along a line circumferentially passing around the work piece, comprising at least one chain guide having a pair of oppositely facing sloping inner sides separated by a central region which has a raised portion located centrally and concentrically thereabout, said raised portion being sufficiently high to support the roller chain to be placed thereupon clear of said central region, but sufficiently low so that when one surface of said roller chain is supported by said raised portion, the opposite surface of said roller chain does not protrude beyond the extremities of said sloping inner sides.

8. Apparatus as defined in claim 7 including, in addition, a roller chain having inside and outside plates, the widest dimensions of each of which are equal.

9. Positioning apparatus for rotating a work piece to be operated upon along a line circumferentially passing around the work piece, comprising:
    (a) at least one drive wheel including a tire having a groove about the circumference thereof,
    (b) at least one idler wheel, said drive and idler wheels supporting said work piece thereupon, and
    (c) positioning means including a chain and power means to drive said chain, said groove in said tire being sufficiently large and deep to receive said chain, which is coupled to said drive wheel to cause the rotation thereof.

References Cited

UNITED STATES PATENTS

| | | | |
|---|---|---|---|
| 658,908 | 10/1900 | Fenner | 74—240 X |
| 2,385,321 | 9/1945 | Miller | 214—340 |
| 2,578,592 | 12/1951 | Pile | 74—240 X |
| 3,026,838 | 3/1962 | Sauder | 214—340 |

FOREIGN PATENTS 760,127   10/1956   Great Britain.

HUGO O. SCHULZ, Primary Examiner.